(12) United States Patent
Hedlund

(10) Patent No.: US 11,660,661 B2
(45) Date of Patent: May 30, 2023

(54) METHOD FOR PRODUCING A REFINER DISC SEGMENT

(71) Applicant: VALMET AB, Sundsvall (SE)

(72) Inventor: Christer Hedlund, Katrineholm (SE)

(73) Assignee: VALMET AB, Sundsvall (SE)

(*) Notice: Subject to any disclaimer, the term of this patent is extended or adjusted under 35 U.S.C. 154(b) by 0 days.

(21) Appl. No.: 17/749,225

(22) Filed: May 20, 2022

(65) Prior Publication Data
US 2022/0274159 A1 Sep. 1, 2022

Related U.S. Application Data

(63) Continuation-in-part of application No. 16/470,335, filed as application No. PCT/EP2017/081679 on Dec. 6, 2017, now abandoned.

(30) Foreign Application Priority Data

Jan. 12, 2017 (DE) ................. 20 2017 100 135.0

(51) Int. Cl.
*B22C 9/02* (2006.01)
*B33Y 80/00* (2015.01)
(Continued)

(52) U.S. Cl.
CPC ................ *B22C 9/02* (2013.01); *B33Y 50/00* (2014.12); *B33Y 80/00* (2014.12); *D21D 1/306* (2013.01); *B02C 7/12* (2013.01)

(58) Field of Classification Search
CPC .... B22C 7/02; B22C 9/02; B22C 9/04; B22C 9/22; B33Y 10/00; B33Y 30/00;
(Continued)

(56) References Cited

U.S. PATENT DOCUMENTS 5,526,992 A 6/1996 Hawen et al.

FOREIGN PATENT DOCUMENTS

CN 103801696 A 5/2014
CN 104476772 A 4/2015
(Continued)

OTHER PUBLICATIONS

"Rapid prototyping and tooling techniques: a review of applications for rapid investment casting"; C. M. Cheah et al; The International Journal of Advanced Manufacturing Technology, Springer, Berlin, DE, vol. 25, No. 3-4; Feb. 1, 2005, pp. 308-320.

*Primary Examiner* — Moshe Wilensky
(74) *Attorney, Agent, or Firm* — Dickinson Wright PLLC

(57) ABSTRACT

The disclosure relates to a method for producing of refiner disc segments. The method for producing of the invention allows for forming a multitude of refiner segments with only one forming process of a first die which may be lightweight and has reduced cost while at the same time a surface structure with high hardness which reduces wear of the die's surface. The method for producing a disc-type refiner segment for refining lignocellulosic material includes 3D printing a first model; forming a first die part using investment casting; 3D printing a second model; combining the first die part and the second model to create a first die model; using the first die model to generate for forming a sand model by compressing molding sand between the first die and the second die; and casting a refiner disc segment by casting a metal material using the sand model.

10 Claims, 6 Drawing Sheets

(51) Int. Cl.
*D21D 1/30* (2006.01)
*B33Y 50/00* (2015.01)
*B02C 7/12* (2006.01)

(58) Field of Classification Search
CPC ........ B33Y 80/00; B33Y 50/02; D21D 1/306; B20C 7/12
See application file for complete search history.

(56) References Cited

FOREIGN PATENT DOCUMENTS

| | | |
|---|---|---|
| CN | 104760288 A | 7/2015 |
| CN | 105364065 A | 3/2016 |
| CN | 105537509 A | 5/2016 |
| CN | 105750500 A | 7/2016 |
| CN | 106182331 A | 12/2016 |
| GB | 2515773 A | 7/2015 |
| WO | 2006043162 A2 | 4/2006 |
| WO | 2017031496 A1 | 2/2017 |

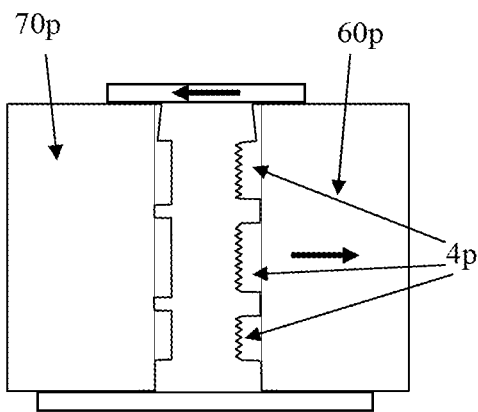 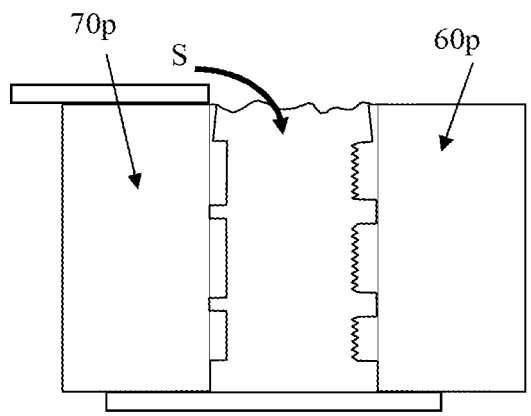
Fig. 1(a) Prior art
Fig. 1(b) Prior Art
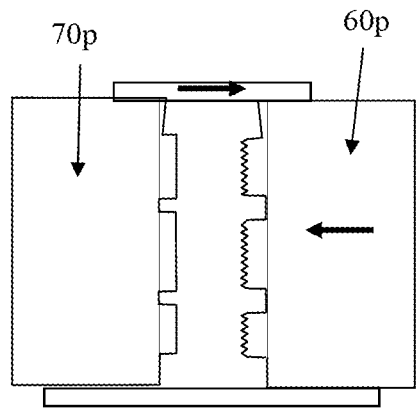 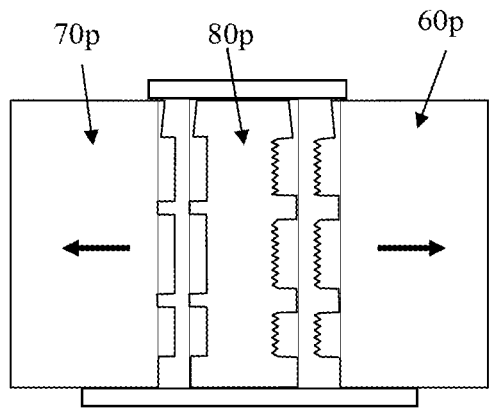
Fig. 1(c) Prior Art
Fig. 1(d) Prior Art
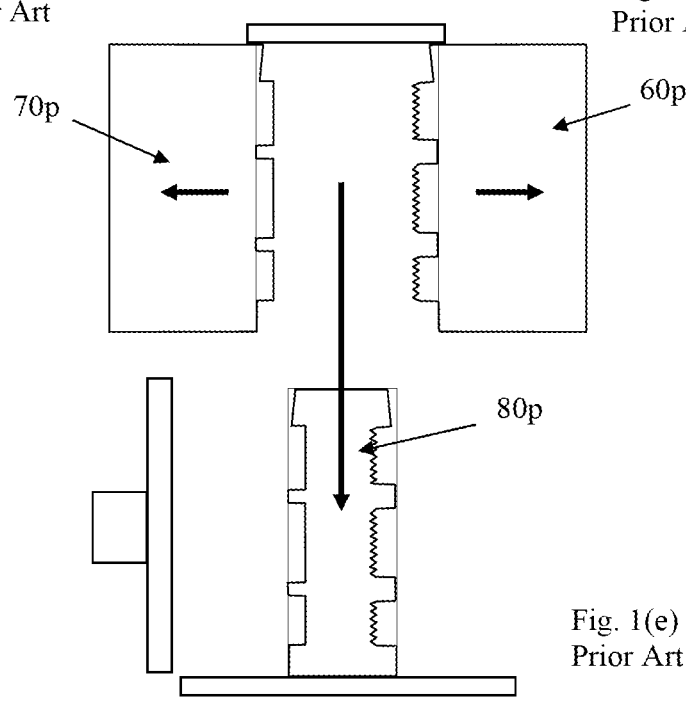
Fig. 1(e) Prior Art

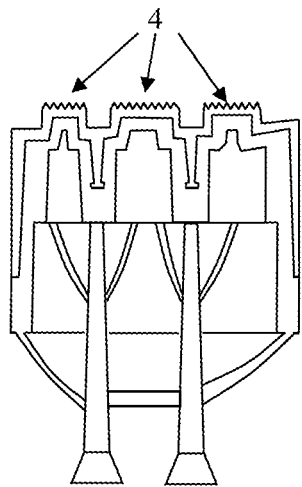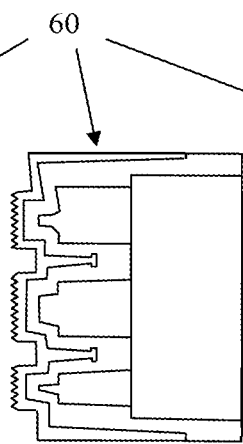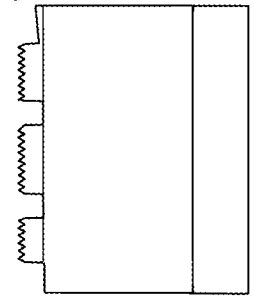
Fig. 5(a)  Fig. 5(b)  Fig. 5(c)
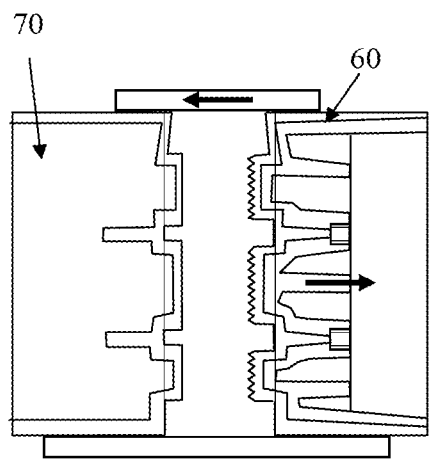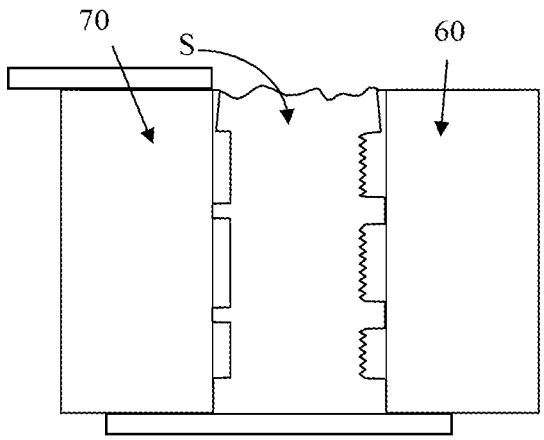
Fig. 6(a)  Fig. 6(b)

METHOD FOR PRODUCING A REFINER DISC SEGMENT

CROSS-REFERENCE TO RELATED APPLICATIONS

This application is a continuation-in-part of U.S. patent application Ser. No. 16/470,335 filed Jun. 17, 2019, which claims priority to PCT/EP2017/081679 filed on Dec. 6, 2017 and DE 20 2017 100 135.0 filed on Jan. 12, 2017, the entire disclosures of which are incorporated herein by reference in their entirety.

TECHNICAL FIELD

The present invention relates generally to the manufacturing of a refiner disc, which is to be used in a disc-type refiner, and in particular to a refiner disc which is manufactured by a process that includes the use of 3D printing.

BACKGROUND

Lignocellulosic material, e.g., wood chips, saw dust and other fibrous material from wood or plant, is refined by mechanical refiners that separate fibers from the fiber network that forms the lignocellulosic material. A typical refiner for processing fibrous material is a disc-type refiner, wherein two refiner plates—which also are referred to as refiner discs—are positioned opposite to each and wherein at least one refiner plate rotates with respect to the other refiner plate. A rotating refiner plate or refiner disc may be referred to as a rotor, while a stationary refiner plate or refiner disc may be referred to as a stator. The rotor and stator plates comprise refiner plate segments, which can be mounted directly on the rotor and stator, respectively, or can be mounted by means of special segment holders.

The lignocellulosic material to be refined is fed into a central inlet in at least one of the two refiner plates, and moves therefrom into a refining gap arranged between the two refiner plates. As at least one of the refiner plates rotates, centrifugal forces created by the relative rotation between the two refiner plates move the lignocellulosic material outwards and towards the periphery of the refiner plates. The opposing refiner plates comprise refiner plates segments, which have surfaces that include bars and grooves; and the lignocellulosic material is—in the refining gap provided between crossing bars of the opposing refiner plate segments—separated into fibers by forces created by the crossing bars as the refiner plates rotate in relation to each other. The bars and grooves of a refiner plate segment can be arranged in more or less complex and sophisticated patterns, and such segment patterns can further comprise dams and openings, which are arranged to guide lignocellulosic material and/or steam in desired paths and routes.

Over the years, a large variety of refiner segment patterns have been developed, wherein a specific pattern can have designed to, for example, reduce the energy consumption of a refiner, reduce wear of the refiner plate segment, and/or to improve the quality of refined fibers. Specific segment patterns have also been developed to be tailored to specific, more or less local raw materials.

The manufacturing of a refiner segment comprising a novel segment pattern involves different processes and machinery, and comprises typically the following steps. First, a 3D model of the refiner segment is created with a CAD (Computer-Aided Design) package. (The 3D model is actually a mathematical representation of the three-dimensional surface of the refiner segment in question, and is typically stored in a so-called STL (STereoLithography) file.) The 3D model generated by the CAD program then serves as input to a CAM (Computer-Aided Machine) package, which generates a CNC (Computer Numerical Control) code that is used to control a NC controlled cutter or milling machine, which, starting from metal work piece, mills a model of the refiner segment; or, in practice, a front side and a back side of the refiner segment are created These refiner segment model halves are then used to produce a mold, in which the refiner segments are casted, and finally a number of (e.g. 18-20) refiner segments are finally assembled to one refiner disc.

FIG. 1(a)-(e) (also commonly denoted as FIG. 1) are side views illustrating a sand model fabrication process according to the known state of the art. FIG. 2(a)-(c) (also commonly denoted as FIG. 2) are side views illustrating a refiner disc segment fabrication process according to the known state of the art.

With reference to FIG. 1(a), in a sand model fabrication process of the prior art, a first die 60p and a second die 70p are provided forming a gap between another. The first die 60p has surface structures which shall be implemented on an active surface, i.e. a grinding surface, of a refiner disc segment (2p in FIG. 2(c)) formed in the procedure of FIGS. 1 and 2.

The first and second dies 60p and 70p are movable relative to another along a first axis indicated by the arrow on first die 60p. Both dies 60p and 70p are located on a table or the like (no reference sign). The gap between the dies 60p and 70p may be closed by a lid (no reference sign) which may be opened or closed by sliding over or off the gap as indicated by the arrow on the lid.

With reference to FIG. 1(b), the dies are in a first position away from another and the lid is open. Then, molding or foundry sand S is filled into the gap. In FIG. 1(c) the lid is closed and the dies 60p and 70p move to a second position relatively close to another. In this way, sand S in the gap is compressed as it cannot flow out of the gap which is delimited by the dies 60p and 70p, the lid, the table surface and a front cover and a back cover, which are not shown in the figures.

With reference to FIG. 1(d), by said compression of sand S, a model 80p of compressed sand is formed. After completion of the forming process, the dies 60p and 70p move back to the first position leaving the model sand 80p in the gap.

In FIG. 1(e), it is shown how the sand model 80p is removed form the gap between the dies 60p and 70p.

FIG. 2 shows a fabrication process of a refiner disc segment 2p according to the known state of the art. In this example, in FIG. 2(a), multiple sand models 80p, e.g. as produced in the process of FIG. 1, are sequentially arranged in a row as indicated by the arrows. Thus, cavities are formed between two neighboring sand models 80p.

In FIG. 2(b), a metal material M3p is casted into the cavities between two neighboring sand models 80p. It should be understood that front and back sides of the models (i.e. parallel to the figures' plane) as well as the bottom of the models 80p are closed to avoid leakage of liquid metal.

After sufficient cooling time, in FIG. 2(c), the production of the refiner disc segments 2p is finished and the refiner disc segments 2p are separated from the sand models 80p. In said separation process, the sand models 80p are destroyed.

As can be appreciated from the above, during processes of manufacturing a refiner disc segment—since the refiner disc segments during operation of the refiner are continuously worn and have to be replaced—contribute negatively to the overall operating economy of a pulp mill. In said process of manufacturing, particularly the fine surface structures 4p on die 60p are subjected to high wear during the compression of sand S (see FIG. 1(c)) such that the quality of the structures and thus, quality of the corresponding structures on the resulting segments 2p decreases rapidly.

Another problem accompanying the manufacturing process described above is that the cutter or milling machine, because of its mechanical machining with relatively coarse cutting tools, sets limits for the type of refiner segment patterns that can be created. In other words, segment patterns which are considered to be more effective in producing high-quality fibers cannot always be produced. Further, the harder the material of the die 60p is, the more difficult it is to subject such material to machining or drilling during fabrication of die 60p. An object of the present invention is therefore to provide a method of fabrication of a refiner segment with improved and/or more efficient manufacturing processes. The fabrication process of the invention allows for forming a multitude of refiner segments with only one forming process of a special die (first die) which may be lightweight and has reduced cost while at the same time a surface structure with high hardness which reduces wear of the die's surface.

BRIEF DESCRIPTION OF THE INVENTION

The above-mentioned objects are achieved with a refiner segment or a refiner segment model according to the independent claims. Preferred embodiments are set forth in the dependent claims. The description below refers to a disc-type refiner segment produced by a method. However, it should be understood that the present disclosure also discloses the corresponding methods of producing the disc-type refiner segments.

It shall be noted that the following descriptions of embodiments are freely combinable unless explicitly excluded.

The present invention relates to a method for producing a disc-type refiner segment for refining lignocellulosic material, comprising the following steps: providing production data of a first model; supplying the production data of the first model to a 3D printer; 3D printing a first model; using the first model to generate a first part mold; molding or casting with a first metal material having a first melting point a first inner die part using the first part mold; providing production data of a second model; supplying the production data of the second model to a 3D printer; 3D printing a second model from a printing material (i.e. a material with low melting point); combining the first inner die part and the second model to create a first die model; using the first die model to generate a first die mold; performing a burnout process on the first die mold; molding or casting with a second metal material having a second melting point a first die using the first die mold, wherein the second melting point is lower than the first melting point; providing a second die; forming a sand model by compressing molding sand between the first die and the second die; and casting a refiner disc segment by casting a metal material using the sand model.

In another embodiment, the steps of forming a sand model and casting the refiner disc segments comprise subsequently forming at least sand models by compressing molding sand between the first die and the second die; combining the at least sand models to form a row; and casting the refiner disc segments by casting a metal material into the gaps between two neighboring sand models of the row.

In another embodiment, the printing material (with low melting point) is selected from wax, plastic, resin, and a polymer material.

In another embodiment, the step of 3D printing a first model comprises 3D printing the first model from a printing material (a material with low melting point), and the step of using the first model to generate a first sand mold comprises performing a burnout process on the first sand mold.

In another embodiment, the casting steps or molding steps comprise vacuum pressure casting, counter-gravity casting, an investment casting process, lost foam casting, and lost wax casting. The skilled person will acknowledge the usefulness of mold release agents or model coatings known in the field which are not described in detail herein.

In another embodiment, the method further comprises at least one chasing process after one or both of the 3D printing steps.

In another embodiment, the method further comprises at least one chasing process after one or all of the molding steps or casting printing steps. In the context of the present application, a chasing process is performed removing vents and feeders formed by filling the spuring cavities added to the model. This results in a first inner die part for further processing. Further, surface processing (smoothing of edges and rough surfaces) may be performed during chasing.

In another embodiment, the first part mold is a sand mold or a ceramic shell mold.

In another embodiment, the first die mold is a sand mold or a ceramic shell mold.

Generally, in the present disclosure, the production data may be provided in any suitable data type. Usually, 3D printable models may be created with a computer-aided design (CAD) package, via a 3D scanner, or by a plain digital camera and photogrammetry software. 3D printed models created with CAD result in reduced errors and can be corrected before printing, allowing verification in the design of the object before it is printed. Accordingly, CAD data are preferred in the present disclosure.

Generally, in the present disclosure, the printing step may be performed by any suitable 3D printer type. Preferred printing materials are selected from plastics, polymers, and wax. The present invention should not be limited to a specific printing material. In case the 3D printed models are used for a type of investment casting, the printing material shall have good flow characteristics at or above a melting temperature thereof so that the 3D printing material may flow out of the form during a burnout process.

Generally, in the present disclosure, the step of generating a mold (e.g. the first part mold, first die mold etc.) may be performed as follows. Taking the first part mold as an example, the first part mold may be embedded in molding (or foundry) sand or similar materials capable of gathering and keeping the structure of the surface of the first model. For example, the created mold may comprise two or more separate mold parts to allow removal of the 3D printed first model. Preferably, the molds according to the present embodiment are molds from molding sand or a ceramic shell (e.g. formed by repeatably dipping the model in slurry of silica) which is destroyed after the process of casting the mold, i.e. a form of investment casting like, counter-gravity casting, lost foam casting, and lost wax casting. The step of casting or molding is performed by any suitable casting method, e.g. vacuum pressure casting. Preferred casting or molding materials are metals and metal alloys.

In the present invention, the molding or casting a first inner die part using the first part mold is performed with a first metal material having a first melting point. The term "inner" of "first inner die part" refers to the side of the die part which later forms the inner side forming the sand model. The other side of the die, i.e. the "outer" die part either has a less important surface structure or does not actively form the sand model, e.g. merely serves for connecting to a holding tool of a hydraulic press during the form process of the sand models.

The first melting point refers to a temperature of a hard metal alloy, e.g. 316L stainless steel, 347L stainless steel, carbon steel, tungsten steel or the like. Desired characteristic of the first metal material is hardness, most preferably a Knoop Hardness (KHN) of 200 kg/mm$^2$ or more, more preferably 250 kg/mm$^2$ or more to reduce wear of structures on the surface of the first inner die part. The first inner die part will form part of the first die which is used to form multiple sand models. Repeatably forming sand models reduces the structure quality on the first die's surface such that a hard material is preferable to be able to use the first die for a long time.

Then, combining the first inner die part and the second model to create a first die model is performed. Preferably, the 3D printed second model is simply stuck on the first inner die part. Alternatively, the second model may be directly 3D printed onto a surface (e.g. a flat surface opposite of the surface having grinding structures) of the first inner die part. The printing material has good flow characteristics at or above its melting temperature so that the 3D printing material may flow out of the form during a burnout process. Examples are wax, plastic, polymers or the like.

Then, using the first die model a first die mold is generated and a burnout process on the first die mold is performed to remove the printing material forming the second model.

Then, molding or casting with a second metal material having a second melting point a first die using the first die mold is performed. The second melting point must be lower than the first melting point to avoid re-melting of the first metal material. Said second melting point refers to a temperature of a soft metal alloy, e.g. aluminum or the like. Desired characteristic of the second metal material is good mechanical strength and low weight. The cavity formed by the second model after the burnout process will form the outer die part which is used be connected to a holding tool or to press form a surface of the sand models without fine structures. Thus, wear of the die part formed of the second metal material is less critical and a softer, lighter material may be used. After the casting and preferably chasing of the product of the molding or casting with the second metal material, the first die is completed and may be removed from the first die mold.

After the first die is completed, a second die is provided and a sand model is formed between the first die and the second die by compressing molding sand between the first die and the second die. The second die may be simple part which merely forms a flat surface of the sand model or punches holding cavities or bolt holes into the sand model. Alternatively, the process of forming a second die may be identical to the above forming process of the first die. However, since the surface structures of the second die (which will form the backside of the resulting refiner disc segment) are objected to wear less than the surface actively grinding material, the structures of the second die are not as detailed as the grinding structures of the first die and mechanical characteristics of the material of the second die (hardness) are not that important. Thus, the second die may be completely formed of the second metal material.

Accordingly, the step of providing a second die may include providing production data of a third model; supplying the production data of the third model to a 3D printer; 3D printing a third model; using the third model to generate a second die mold; and molding or casting with the second metal material the second die using the second die mold.

After forming of the sand model, a refiner disc segment is casted by casting a third metal material on the sand model's surface, which was formed by the first die. In this way, the surface structures press formed by the first die are reproduced on the refiner disc segment. Due to the hardness of the first die's surface (first metal material) the quality of the surface structures of the first die remain at high quality over multiple forming sand model forming processes. The third metal material may be identical to the first metal material or may be another metal material with mechanical properties desired for grinding surfaces (high hardness).

Benefits of the present invention lie in the variety of shapes and arrangements of surface structures that may be implemented in the produced disc-type refiner segments. Further, the number of sand models and thus refiner disc segments producible by one first die is increased. The conventional production of segments, molds, and segment patterns through cutting tools is expensive and limited by the travel paths the cutting tool must take to form cavities and passages in the disc-type refiner segment. Further, cutting hard meatal materials is nearly impossible since breaking of the hard materials occurs too often. The inventive method implementing a combination of 3D printing of models and casting in multiple steps does not have such limitations such that new structures may be implemented and tested with moderate expenses.

BRIEF DESCRIPTION OF THE FIGURES

FIG. 1(*a*)-(*e*) are side views illustrating a sand model fabrication process according to the known state of the art.

FIG. 6 (*a*)-(*b*) are side views illustrating a fabrication process of a sand model fabrication process according to an embodiment of the present disclosure.

DETAILED DESCRIPTION OF PREFERRED EMBODIMENTS

Figure 2A:
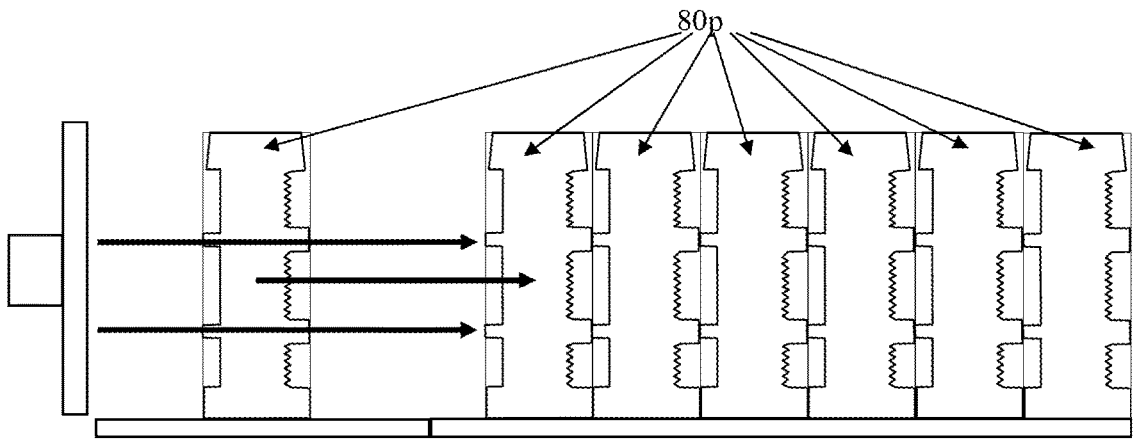
FIG. 2(*a*)-(*c*) are side views illustrating a refiner disc segment fabrication process according to the known state of the art.

In the following, the present disclosure will be described with reference to figures schematically showing various exemplary embodiments. The embodiments shown in the figures are not necessarily shown to scale, and in some cases dimensions may have been selected which more clearly show the principle of the present invention. Identical or similar reference signs for identical or similar elements and components are used both in the drawing and in the description. All embodiments shown and described are combinable with each other in whole or in part, unless explicitly stated otherwise.

Both in the description and in the figures, the same or similar reference signs are used to refer to the same or similar elements or components. In order to keep the description concise, elements already mentioned in other figures are not necessarily explicitly mentioned again in the description for each further figure, especially since a list of reference signs is attached.

The present invention is based on the use of a 3D printer to produce a model of a refiner segment structure. Said model is used to produce a mold in which a first die is cast. The first die forms a surface of a sand model, which then is used for casting the final refiner disc segment.

FIG. 3 (a)-(g) (also commonly denoted as FIG. 3) are different views illustrating a fabrication process of a first inner die part according to an embodiment of the present disclosure.

Figure 3A:
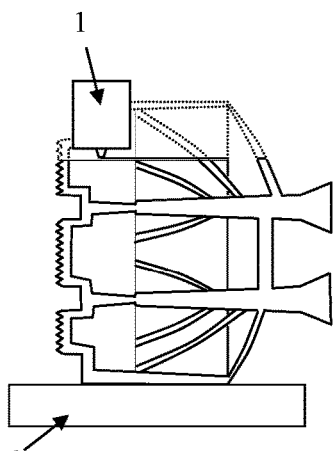
FIG. 3 (*a*)-(*g*) are different views illustrating a fabrication process of a first inner die part according to an embodiment of the present disclosure.

In FIG. 3(a), a first model 10 is 3D printed using a 3D printer system comprising a 3D printer head 1 and a table 3. Further elements of such 3D printers are not explicitly shown and may comprise supply of printing material, motors for moving the printer head 1 and/or table 3, circuitry, power source, data storage and the like as acknowledged by the person skilled in the art. During fabrication indicated in FIG. 3(a), production data of a first model is provided, supplied to the 3D printer; and the first model 10 is 3D printed.

In the embodiment shown in FIG. 1, the material used by the 3D printer head 1 ("printing material") is a material with low melting point, e.g. below 200° C., preferably below 150° C., most preferably below 100° C., e.g. wax, plastic, resin, or a polymer material (e.g. photopolymer on wax basis assisted by LED curing at printing). Most preferably, the printing material is ductile at room temperature to allow for convenient 3D printing at room temperature.

Further, the printing material preferably as a low viscosity (e.g. at or below 800 cps, preferably 700 at 25° C.) above a certain temperature, e.g. 200° C. so that the printing material is able to flow our of a form during a burnout process described later. Alternatively, the printing material may also be burned to ashes or evaporated during the burnout process.

Figure 3B:
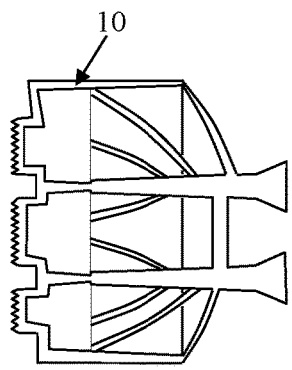

FIG. 3(b) shows the finished 3D printed first model 10. As shown in FIG. 3(b) the first model contains features of the refiner disc segment to be produced, e.g. surface structures 4, and also a tree-like structure ("spruing", no reference signs) of the printing material that will provide paths for the molten casting material to flow and for air to escape (see FIG. 3(c) et seqq.). The spruing does not have to be hollow, as it will be melted out later in the process. The spruing also includes the so-called cups (funnel-shaped structures on the right of FIG. 3(b)) which later serve for forming a reservoir and casting aid during casting (see FIG. 3(e)).

Figure 3C:
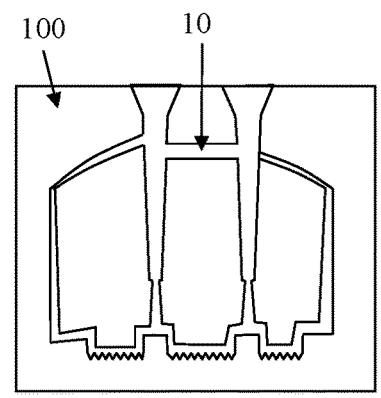

FIG. 3(c) shows that the first model 10 is used to form a mold 100, denoted as first part mold 100. In one embodiment, the mold 100 may be formed by embedding the first model in casting sand (like the sand used for forming the sand models 80, 80 p described herein). Alternatively, the first model 10 may also be coated (dipped) in silica slurry and dried repeatedly until a silica coat around of desired thickness is formed around the model. The way of forming the first part mold 100 is not particularly limited herein.

Figure 3D:
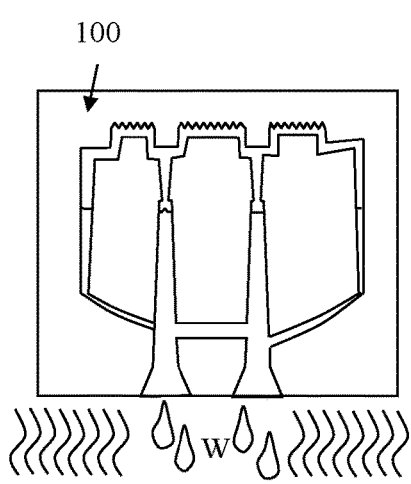

In the embodiment shown in FIG. 3(d), a burnout process is performed on the mold 100 obtained in FIG. 3(c). That is, the first part mold 100 containing the first model 10 is placed cup-down (i.e. openings of the mold 100 facing down) in a kiln or the like, whose heat hardens the mold material (e.g. sand, silica) into a shell, and the printing material W of first model 10 melts and runs out. The melted material W can be recovered and reused or it is simply burned up or evaporated (not shown). Now all that remains of the original first model 10 is the negative space formerly occupied by the printing material inside the hardened shell of the first part mold 100. The spuring, i.e. feeder, vent tubes and cup are also now hollow. The temperature of the burnout process is also dependent on the used printing material.

Figure 3E:
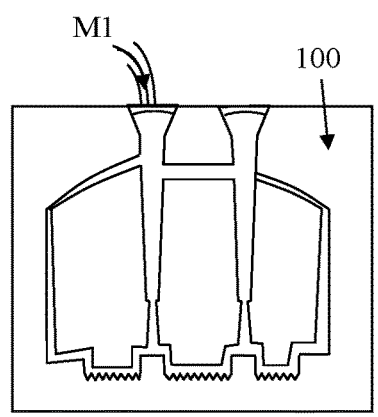

FIG. 3(e) shows a casting process according to one embodiment of the present disclosure. The burned-out mold 100 obtained in FIG. 3(d) is turned by 180° and a first casting material ("first metal material having a first melting point") M1 is filled into the cups of the mold 100. The first metal material is characterized by both, a relatively high melting point (compared to the second metal material M2 described below) and high hardness. Preferably, the first melting point is above 1200° C., more preferably above 1350° C.

More particularly, the first melting point may refer to a melting temperature of a hard metal alloy, e.g. 316L stainless steel, 347L stainless steel, carbon steel, tungsten steel or the like. Another desired characteristic of the first metal material is hardness, most preferably a Knoop Hardness (KHN) of 200 kg/mm$^2$ or more, more preferably 250 kg/mm$^2$ or more.

Figure 3F:
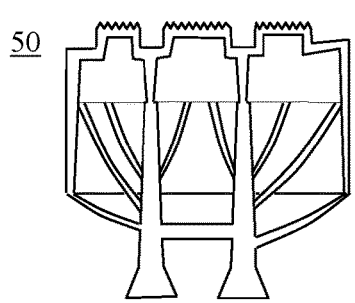

The casting process in FIG. 3(e) results in the first inner die part 50 depicted in FIG. 3(f). In the present embodiment, the cast first inner die part 50 is removed from mold 100 by destroying the mold 100. Alternatively, mold 100 may also be a reusable mold of two shell parts which are separated to lay open the first inner die part 50. The word "inner" in first inner die part 50 refers to the location of the first inner die part 50 in the final die 30 (see FIGS. 4(b) and (c)). That is, the first inner die part 50 provides the surfaces that will be in contact with the casting sand S during compression of the sand model (c.f. 80 in FIG. 7, 80p in FIG. 1). Accordingly, the position of the first inner die part 50 is on the inside of the gap between first and second dies (60 and 70 in FIG. 7).

Figure 3G:
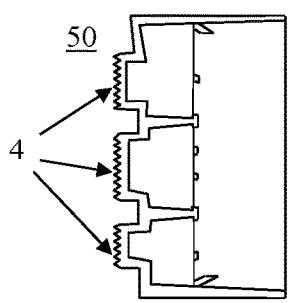

The first inner die part 50 is subjected to a chasing process for removing the vents and feeders formed by filling the spuring cavities which results in first inner die part 50 depicted in FIG. 3(g). Further, surface processing may be performed during chasing.

Figure 7A:
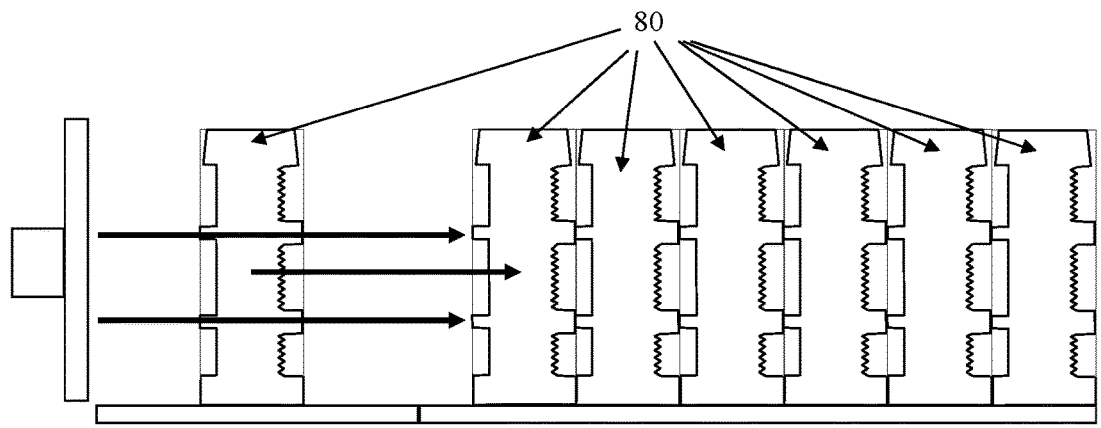
FIG. 7 (*a*)-(*c*) are side views illustrating a fabrication process of a refiner disc segment fabrication process according to an embodiment of the present disclosure.
Figure 7B:
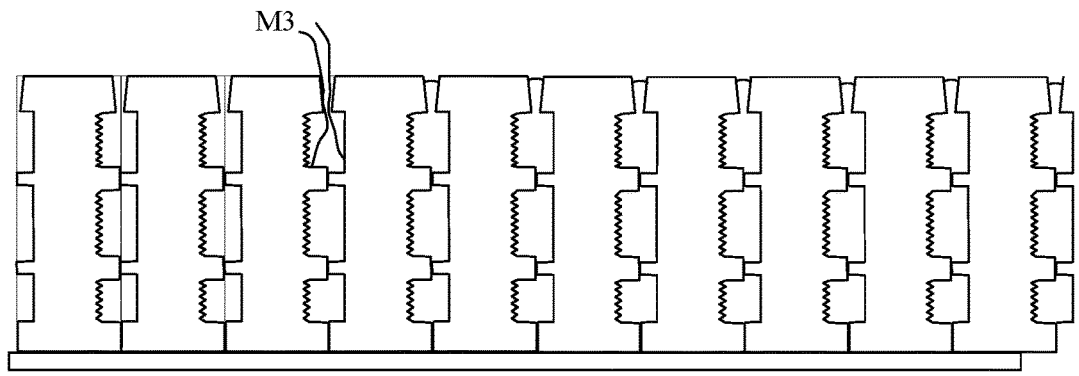
Figure 7C:
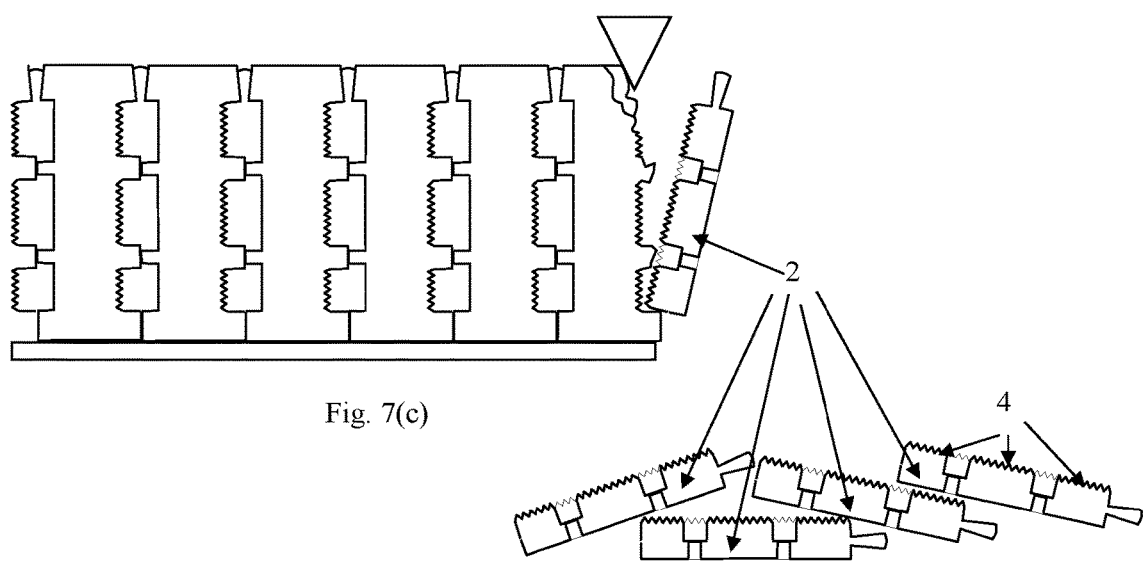

As mentioned above, the most important part of the first inner die part 50 are the surface structures 4 which will determine the corresponding surface structures 4 of the final refiner disc segments (2 in FIG. 7). To reduce wear of said surface structures 4 first metal material M1 has high hardness.

FIG. 4 (a)-(f) (also denoted as FIG. 4) and FIG. 5 (a)-(c) (also denoted as FIG. 5) are different views illustrating a fabrication process of a first die 60 according to an embodiment of the present disclosure.

Figure 4A:
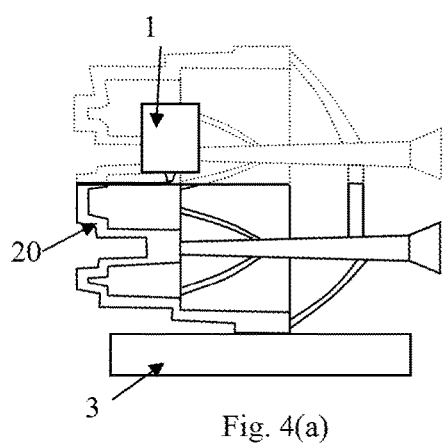
FIGS. 4 (*a*)-(*f*) and 5 (*a*)-(*c*) are different views illustrating a fabrication process of a first die according to an embodiment of the present disclosure.

In FIG. 4(a), a 3D printing process of a second model 20 using a 3D printer is depicted. The 3D printer as well as the characteristics of the 3D printing process may be similar or identical to the 3D printing of the first model 10 in FIG. 3(a) (apart from the production data, apparently) and details thereof are not repeated here.

Figure 4B:
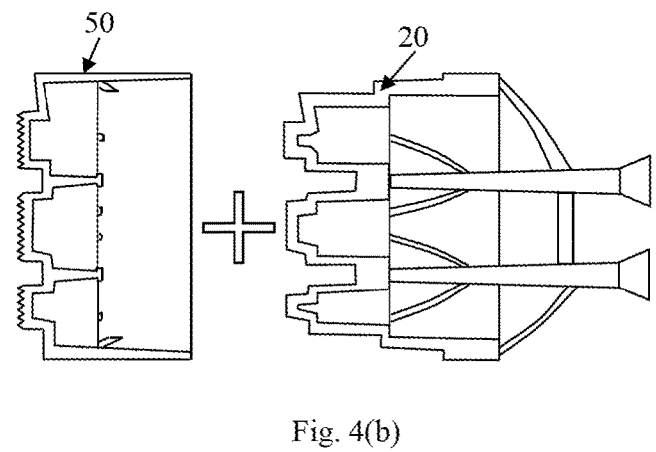

As indicated in FIG. 4(b), the second model 20 is then combined with the first inner die part 50 obtained in the process of FIG. 3. "Combined" may mean that a cavity of the first inner die part 50 corresponds to a protuberance of the second model 20 and that the form-fitting first inner die part 50 and second model are simply stuck together. Alternatively, the two parts 20 and 50 may also be adhered to another or the 3D printing of the second model may be performed directly onto the first inner die part 50 (instead of the table 3 of FIG. 4(a)). The second model 20 depicted also contains spuring as descried above.

Figure 4C:
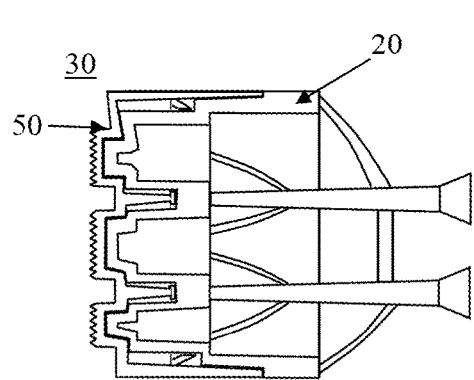
Figure 4D:
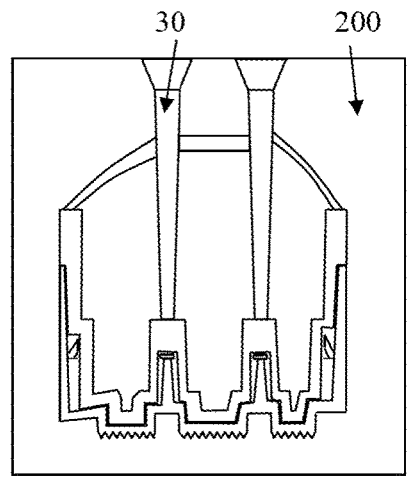

FIG. 4(c) indicates the result of the combination of first inner die part 50 and second model 20, i.e. the first die model 30 as intermediate product. The first die model 30 is then used to produce a first die mold 200 as shown in FIG. 4(d). The process of forming the mold is preferably similar or identical to the process of forming the first part mold 100 (FIG. 3(c) with related description above) and details thereof are not repeated herein.

Figure 4E:
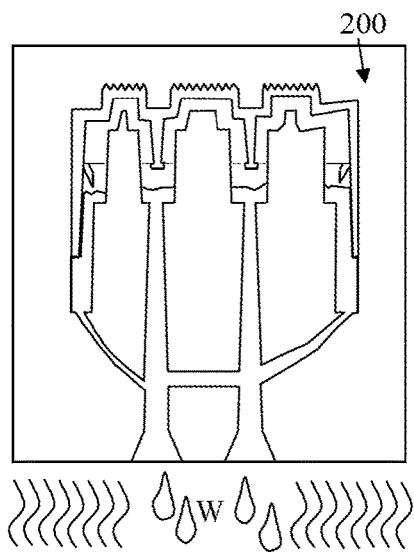

The difference between the burnout process of FIG. 3(d) with description above and the burnout process in FIG. 4(e) is that only the parts occupied by the second model 20 are burned-out of the first die mold 200. The part of first die model 30 established by the first inner die part 50 is made from hard metal and is not affected by the burnout process and remain in the first die mold 200.

Figure 4F:
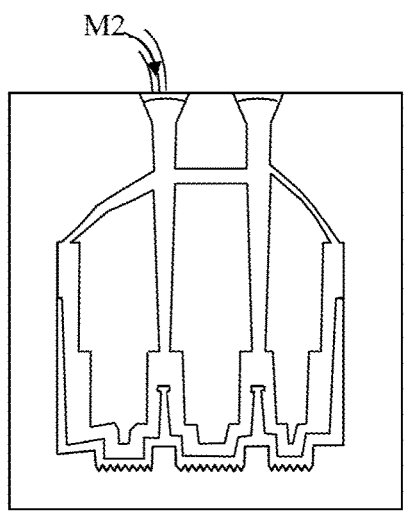

In FIG. 4(f), a casting process using a second metal material M2 and the burned-out first die mold 200 obtained in FIG. 4(e) is depicted which results in the first die 60 illustrated in FIG. 5. As shown, during casting with the second metal material M2 in mold 200, the first inner die part 50 is encapsulated (on the "backside" thereof) with the second metal material M2.

As mentioned above, the second metal material M2 must have a lower melting point than the first metal material M1 to avoid re-melting of the first inner die part 50 is made from the first metal material M1. Since the hardness of the second metal material is of reduced relevance, a rather soft and light material is preferred, e.g. aluminum or an aluminum allow. The combination of a hard but rather thin hard metal surface provided by first inner die part 50 and a softer metal core form the second metal material also offers advantageous resistance to breaking due to higher flexibility compared with a die only made from the hard metal material M1. To avoid damage (cracks) during heating or cooling of the first die (e.g. after the casting of the second metal material M2 or during operation) stress release gaps may be provided (not shown).

In FIG. 5(a), a cut through the second die 60 and the resulting surface structures 4 of the first die 60 are shown. The spuring (vents and flow channels) of the second model now cast in the second metal material M2 and part of the first die may not need to be removed (chasing) but may serve as holding structures to improve stability and rigidity of the first die 60. FIG. 5(b) show the second die 60 after a chasing process. FIG. 5(c) is a side view from outside showing the outline of the second die 60 including the surface structures and the side wall.

FIG. 6 (a)-(b) are side views illustrating a fabrication process of a sand model according to an embodiment of the present disclosure. The first die 60 is then used to form a sand model by compressing (e.g. foundry) sand between the first die 60 and a second die 70 as shown in FIGS. 6(a) and (b) (commonly denoted as FIG. 6). The process indicated in FIG. 6 may be similar or identical to the process described with reference to FIG. 1 (i.e. the prior art section). However, the inventive is not limited thereto. The second die may also be formed by a flat surface (e.g. a fixed wall) and the first die is pressed against the wall with sand filled in a gap between them. The resulting sand model may have a side wall forming a trough with the negative of the surface structures on its bottom. In this very simple embodiment, the resulting refiner disc segment may be cast by filling the trough with a metal melt (third metal material).

In the shown embodiment, however, sand S is compressed between the first and second dies 60 and 70 (also refer to dies 60 and 70 in FIG. 1). Thus, the side of the sand model (80 in FIG. 7) corresponding to the second die's surface may also have certain structures which may serve fixing the resulting refiner disc segment to a carrier or the like, for example protrusions fitting to holes of the carrier (or vice versa), bolt holes etc.

Figure 2B:
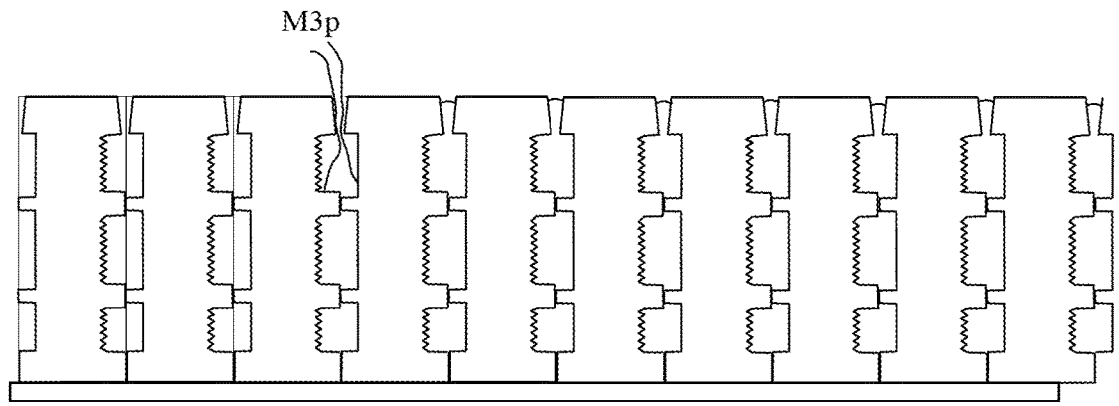
Figure 2C:
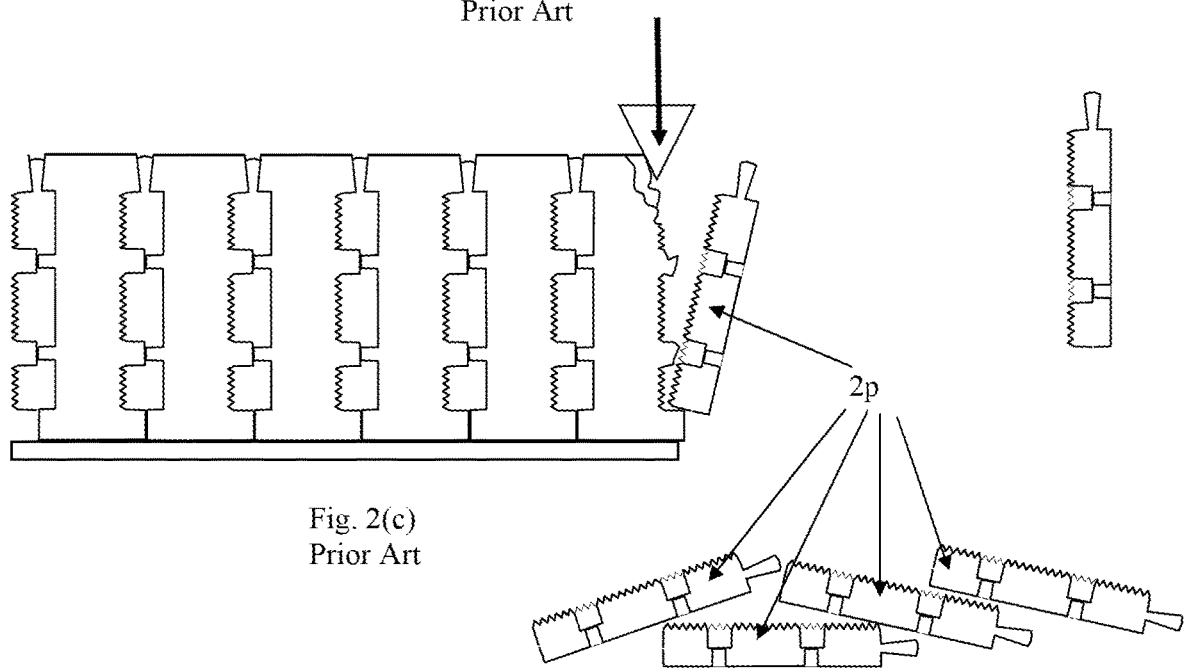

FIG. 7 (a)-(c) (commonly denoted as FIG. 7) are side views illustrating a fabrication process of a refiner disc segment fabrication process according to an embodiment of the present disclosure. The process shown in FIG. 7 may be similar or identical to the process described with reference to FIG. 2 above, i.e. the prior art section. Difference between the embodiment of FIG. 7 and the prior art is the stable quality of the sand models 80 produced. This, in turn, leads to improved quality, higher operation lifetime and reduced costs of the obtained refiner disc segments.

From the above, it should be appreciated that the refiner disc segments may be comprise complex geometrical shapes, e.g. corners, edges and angles, which are not or hard reproducible issuing cutting tools or the like. While the invention has been described in connection with what is presently considered to be the most practical and preferred embodiment, it is to be understood that the invention is not limited to the disclosed embodiments, but, on the contrary, is intended to accommodate various modifications and equivalent arrangements include within the spirit and the scope of the appended claims. Further, it should be understood that all described embodiments are combinable and compatible unless otherwise specified.

REFERENCE SIGNS LIST 1 3D printer
2 refiner disc segment
3 table
4 surface structures
10 first model
20 second model
30 first die model
50 first inner die part
60 first die
70 second die
80 sand model
100 first part mold
200 first die mold
M1 first metal material
M2 second metal material
M3 third metal material
W printing material with low melting point
S molding sand
2p refiner disc segment (prior art)
4p surface structures (prior art)
60p first die (prior art)
70p second die (prior art)
80p sand model (prior art)
M3p third metal material (prior art)

What is claimed is:

1. A method for producing a disc-type refiner segment for refining lignocellulosic material, comprising:
    providing production data of a first model;
    supplying the production data of the first model to a 3D printer;
    3D printing the first model;
    using the first model to generate a first part mold;
    molding or casting with a first metal material having a first melting point a first inner die part using the first part mold;
    providing production data of a second model;

supplying the production data of the second model to a 3D printer;

3D printing the second model from a printing material;

combining the first inner die part and the second model to create a first die model;

using the first die model to generate a first die mold;

performing a burnout process on the first die mold;

molding or casting with a second metal material having a second melting point a first die using the first die mold, wherein the second melting point is lower than the first melting point;

providing a second die;

forming a sand model by compressing molding sand between the first die and the second die; and casting a refiner disc segment by casting a third metal material using the sand model.

2. The method according to claim 1, wherein the steps of forming the sand model and casting the refiner disc segments comprise:

subsequently forming at least sand models by compressing molding sand between the first die and the second die;

combining the at least sand models to form a row; and casting the refiner disc segments by casting a metal material into the gaps between two neighboring sand models of the row.

3. The method according to claim 1, wherein the material with low melting point is selected from wax, plastic, resin, and a polymer material.

4. The method according to claim 1, wherein the step of 3D printing the first model comprises 3D printing the first model from a material with low melting point, and the step of using the first model to generate a first sand mold comprises performing a burnout process on the first sand mold.

5. The method according to claim 1, wherein the casting steps or molding steps comprise vacuum pressure casting, counter-gravity casting, an investment casting process, lost foam casting, or lost wax casting.

6. The method according to claim 1, further comprising at least one chasing process after one or both of the 3D printing steps.

7. The method according to claim 1, further comprising at least one chasing process after one or all of the molding steps or casting steps.

8. The method according to claim 1, wherein the first part mold is a sand mold or a ceramic shell mold.

9. The method according to claim 1, wherein the first die mold is a sand mold or a ceramic shell mold.

10. The method according to claim 1, wherein the step of providing the second die comprises:

providing production data of a third model;

supplying the production data of the third model to a 3D printer;

3D printing the third model;

using the third model to generate a second die mold; and molding or casting with the second metal material the second die using the second die mold.

* * * * *